US006990680B1

(12) United States Patent
Wugofski

(10) Patent No.: US 6,990,680 B1
(45) Date of Patent: *Jan. 24, 2006

(54) SYSTEM FOR SCHEDULED CACHING OF IN-BAND DATA SERVICES

(75) Inventor: Theodore D. Wugofski, Fort Worth, TX (US)

(73) Assignee: Gateway Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,584

(22) Filed: Jan. 5, 1998

(51) Int. Cl.
*H04N 7/00* (2006.01)
*H04N 5/50* (2006.01)
*H04N 5/445* (2006.01)
*H04N 7/173* (2006.01)

(52) U.S. Cl. .............................. 725/58; 725/47; 725/50; 725/132; 725/140

(58) Field of Classification Search .................... 348/7, 348/478; 345/327; 725/50, 132, 149, 152, 725/56–105, 58, 47, 140
See application file for complete search history.

(56) References Cited

U.S. PATENT DOCUMENTS

| | | | | |
|---|---|---|---|---|
| 3,993,955 A | * | 11/1976 | Belcher et al. .............. 348/463 |
| 4,567,512 A | * | 1/1986 | Abraham ........................ 348/7 |
| 4,751,578 A | * | 6/1988 | Reiter et al. ................. 358/183 |
| 4,862,268 A | * | 8/1989 | Campbell et al. ............ 455/4.1 |
| 5,353,121 A | * | 10/1994 | Young et al. ................ 348/563 |
| 5,404,505 A | * | 4/1995 | Levinson et al. ........... 725/105 |
| 5,465,385 A | * | 11/1995 | Ohga et al. .................. 455/6.1 |
| 5,497,187 A | * | 3/1996 | Banker et al. ................. 348/6 |
| 5,550,576 A | * | 8/1996 | Klosterman ................... 725/49 |
| 5,652,613 A | * | 7/1997 | Lazarus et al. ................ 348/7 |
| 5,657,072 A | * | 8/1997 | Aristides et al. ............. 348/13 |
| 5,666,293 A | * | 9/1997 | Metz et al. .................. 725/131 |
| 5,686,954 A | * | 11/1997 | Yoshinobu et al. ........... 348/13 |
| 5,774,664 A | * | 6/1998 | Hidary et al. .......... 395/200.48 |
| 5,790,172 A | * | 8/1998 | Imanaka ........................ 348/7 |
| 5,850,218 A | * | 12/1998 | LaJoie et al. ............... 345/327 |
| 6,020,880 A | * | 2/2000 | Naimpally ................... 345/327 |
| 6,025,837 A | * | 2/2000 | Matthews, III et al. ..... 725/109 |
| 6,097,878 A | * | 8/2000 | Saib ............................. 386/83 |
| 6,144,402 A | * | 11/2000 | Norsworthy et al. ........ 725/109 |
| 6,208,384 B1 | * | 3/2001 | Schultheiss ................. 348/552 |
| 6,208,799 B1 | * | 3/2001 | Marsh et al. .................. 386/83 |
| 6,247,176 B1 | * | 6/2001 | Schein et al. ................. 725/43 |
| 2002/0032907 A1 | * | 3/2002 | Daniels ....................... 725/51 |

* cited by examiner

*Primary Examiner*—Christopher Grant
*Assistant Examiner*—Reuben Brown
(74) *Attorney, Agent, or Firm*—Ross F. Hunt, Jr.; Stites & Harbison PLLC

(57) ABSTRACT

A system for scheduling caching of in-band data operates as part of a computerized system to receive and store data broadcast in-band in a channel at a scheduled time. The scheduled caching system determines the scheduled time and channel for the in-band data broadcast and causes a real-time clock in the computerized system to schedule a subsequent execution of the scheduled caching system at approximately the scheduled time. When the scheduled caching system subsequently executes, the scheduled caching system instructs tuning circuitry in the computerized-system to tune to the scheduled channel, receives the in-band data from the tuning circuitry and stores the in-band data on mass storage for subsequent processing. The scheduled caching system also powers on the tuning circuitry and parses the in-band data from other content broadcast in the channel if necessary.

36 Claims, 5 Drawing Sheets

SYSTEM FOR SCHEDULED CACHING OF IN-BAND DATA SERVICES

RELATED APPLICATIONS

This application is related to the co-assigned and co-filed applications, "Method for managing multiple channel maps from multiple input devices in a multimedia system," "System for time-shifting events in a multi-channel convergence system," "Method and system for associating web sites to television programs," "Individualized parameter control for multiple media sources in a data processing system," "System for combining electronic program guide data," and "Integration of Internet sources into an electronic program database list," all of which are hereby incorporated by reference.

FIELD OF THE INVENTION

The present invention is related to broadcast data services and in particular to scheduled caching of in-band data received from a broadcast data service.

BACKGROUND OF THE INVENTION

One of the current trends in consumer electronics is the convergence of television technology and computer technology. Starting with the inclusion of a simple microprocessor chip in a television set, the convergence of the two technologies has evolved into sophisticated personal computers equipped with television tuners and large VGA monitors. Convergence systems enable the user to perform data processing tasks while simultaneously viewing a broadcast television program. The advent of personal satellite receivers has also opened up a vast range of broadcast content.

Data from an external source has long been available to personal computer through dial-up connections to private bulletin boards or public data services such as the Internet. Originally, the computer user had to "pull" the data into the computer by dialing into the service and requesting a download. Later, automatic dial-up utilities were introduced to automate the downloading process when the user was not present. Most recently, "push" technology permits the data service to initiate downloads to a subscriber on a periodic basis assuming the personal computer is on or a scheduling mechanism is available to turn the computer on at the scheduled time.

In the world of broadcast media, such as television, a broadcast channel can transmit data streams as well as audio and video content to a properly equipped tuner/receiver. This transmission method is called "in-band" transmission and currently provides a subscriber with data services such as stock quotes, sports scores, and electronic program guides (EPG) for television schedules. There are multiple ways of transmitting data services in-band. Using EPGs as an example, StarSight Telecast, Inc. places EPG data in the vertical blanking interval in the broadcast television signal while Direct TV™ and Echostar Communications Corp. use a portion of the MPEG2 (Motion Picture Experts Group) data stream broadcast from a digital satellite. The data stream is downloaded to a microprocessor, either in the television or in an attached device, and stored for later processing upon user request.

Because in-band data services frequently modify their data, an updated data stream must be downloaded periodically. However, because the data stream is broadcast in a channel only at certain times, the tuner/receiver must be on and tuned to the correct channel to capture the data at that time. This limitation poses problems for many users who are absent during the times the data stream is being broadcast and do not want to leave their tuner/receiver powered on. Therefore, there is a need for a system that automatically downloads broadcast data from an in-band data service regardless of the presence of the user.

SUMMARY OF THE INVENTION

A system for scheduling caching of in-band data operates as part of a computerized system having tuning circuitry to receive and store data broadcast in-band in a channel at a scheduled time. The scheduled caching system operates in conjunction with a real-time scheduling process provided by the computerized system. A scheduling process determines a scheduled time and channel for the in-band data broadcast and invokes the real-time scheduling process to schedule a caching process for execution at approximately the scheduled time. When executed, the caching process instructs the tuning circuitry to tune to the scheduled channel, receives the in-band data from the tuning circuitry and stores the in-band data on mass storage for subsequent processing. The caching process also powers on the tuning circuitry and parses the in-band data from other content broadcast in the channel if necessary. The in-band data can be broadcast in the vertical blanking interval of a television channel or in a portion of a digital satellite transmission channel. The scheduling process also presents a plurality of schedules to a user for selection. A digital processing system configured to support the scheduled caching system is also disclosed.

Additionally, an information handling system is described as including a tuner and a scheduler. The tuner is capable of turning to a plurality of channels. The scheduler is configurable to determine a scheduled time and a scheduled channel for receiving information associated with the scheduled channel. The tuner tunes to the scheduled channel at approximately the scheduled time to receive the information associated with the scheduled channel. The information can be in-band information, electronic program guide information, or Internet-related information. The scheduler is further described as including a real-time scheduling process, a scheduling process, and a caching process.

Because the scheduled caching system operates autonomously of the user, the user can select in-band data for delivery when the user is not present. The scheduled caching system will automatically power on the tuning circuitry and download the data from the channel at a scheduled time so that the user does not have to leave the tuning circuitry powered on and tuned to the proper channel. Furthermore, because the scheduled caching system stores the data, the user need not be concerned with having to immediately process the data when the download is complete.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

A system for scheduled caching of data from in-band data services is described using an electronic program guide (EPG) delivered in the vertical blanking interval (VBI) of a channel as an example. The use of the VBI for in-band data transmission is not discussed in detail as it is well-known in the art. Further, as will be readily apparent to one skilled in the art, the present invention is not limited to use with VBI services but is equally applicable to other methods of in-band transmission of data services as well. Specifications for other in-band transmission methods can be obtained from organizations such as the European Broadcasting Union, from a data services provider such as Direct TV™, Intel Corp. or Data Broadcasting Corp., or from various public domain sources, such as the Internet.

Figure 1A:
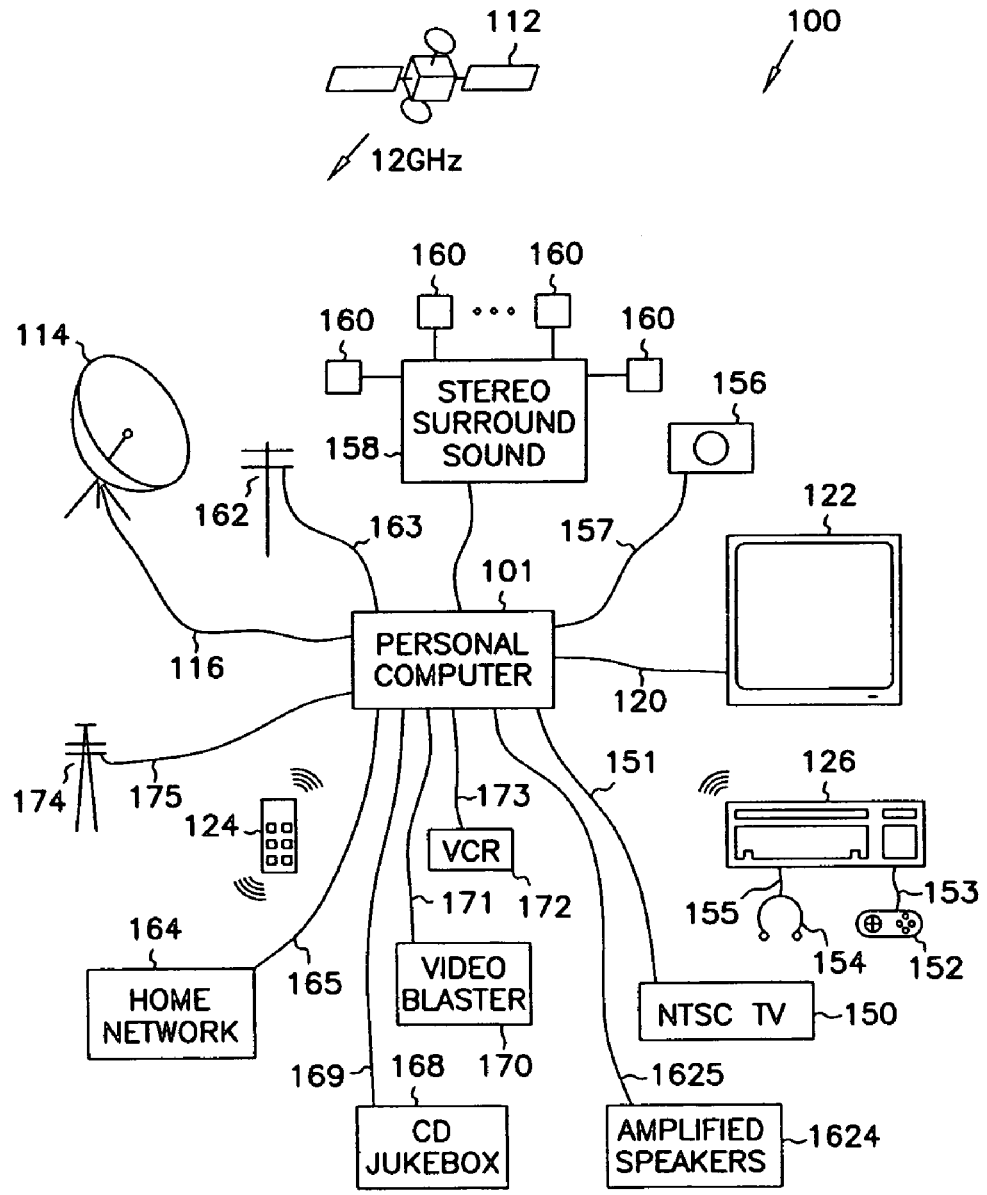
FIG. 1A is a block diagram of hardware components for a convergence system.
Figure 1B:
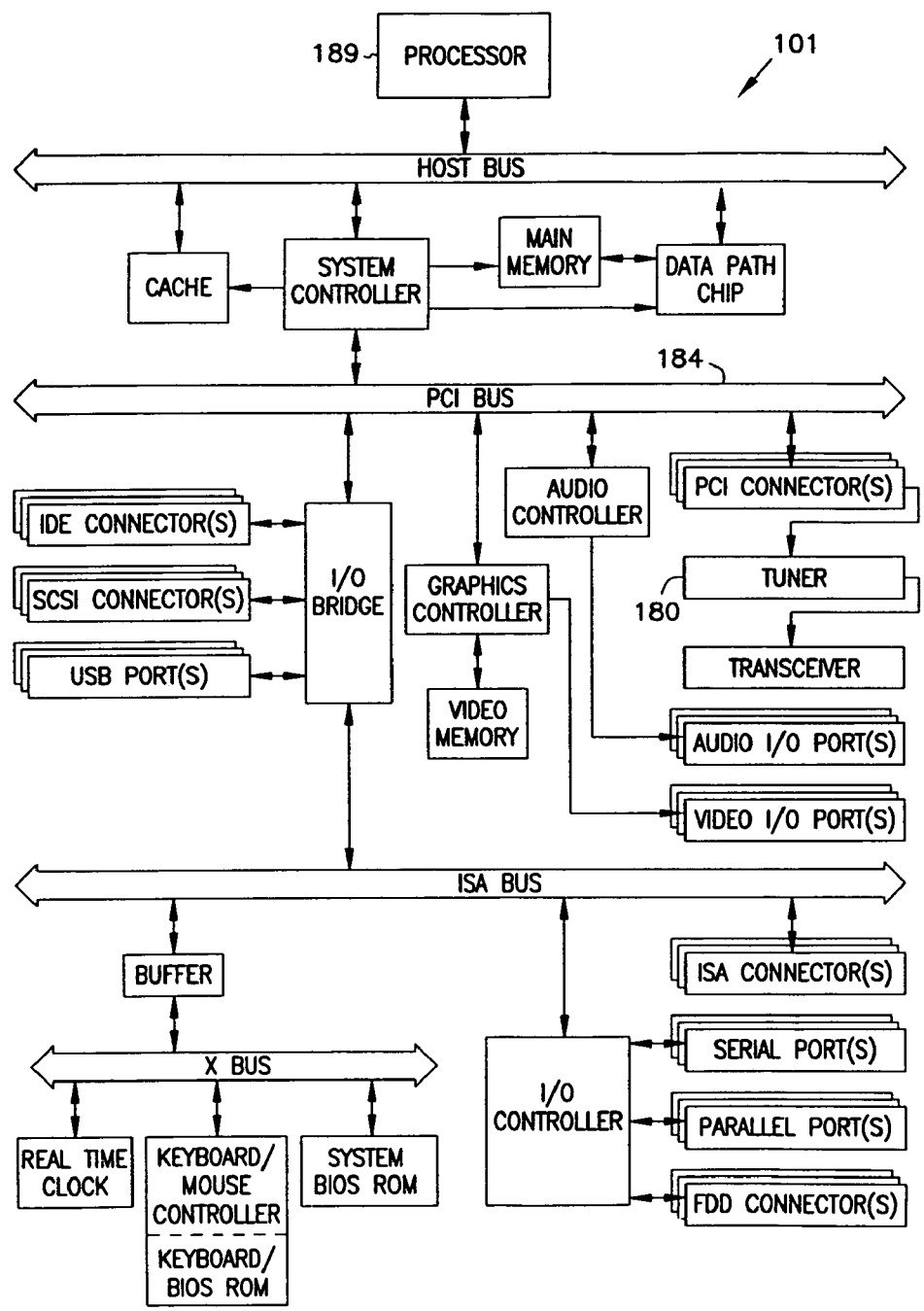
FIG. 1B is a block diagram of a digital processing system shown in FIG. 1A.

The system for scheduled caching of data from in-band data services is part of a convergence system 100 shown in FIG. 1A, such as the Destination personal computer system available from Gateway 2000, Inc., assignee of the present invention. The convergence system 100 incorporates tuner circuitry, such as tuner/receiver 180 in FIG. 1B, into a digital processing system 101, such as a computer which is compatible with standard personal computer systems, and displays television signals and digital output on a large monitor 122 of VGA or better resolution. The tuning circuitry 180 is coupled through a system bus 184 to a microprocessor 186 which controls the operation of the tuner/receiver 180. The scheduled caching system is described in terms of software processes which execute within the microprocessor 186. The processes in the scheduled caching system can be implemented in software, hardware or firmware without departing from the scope of the invention.

Figure 1C:
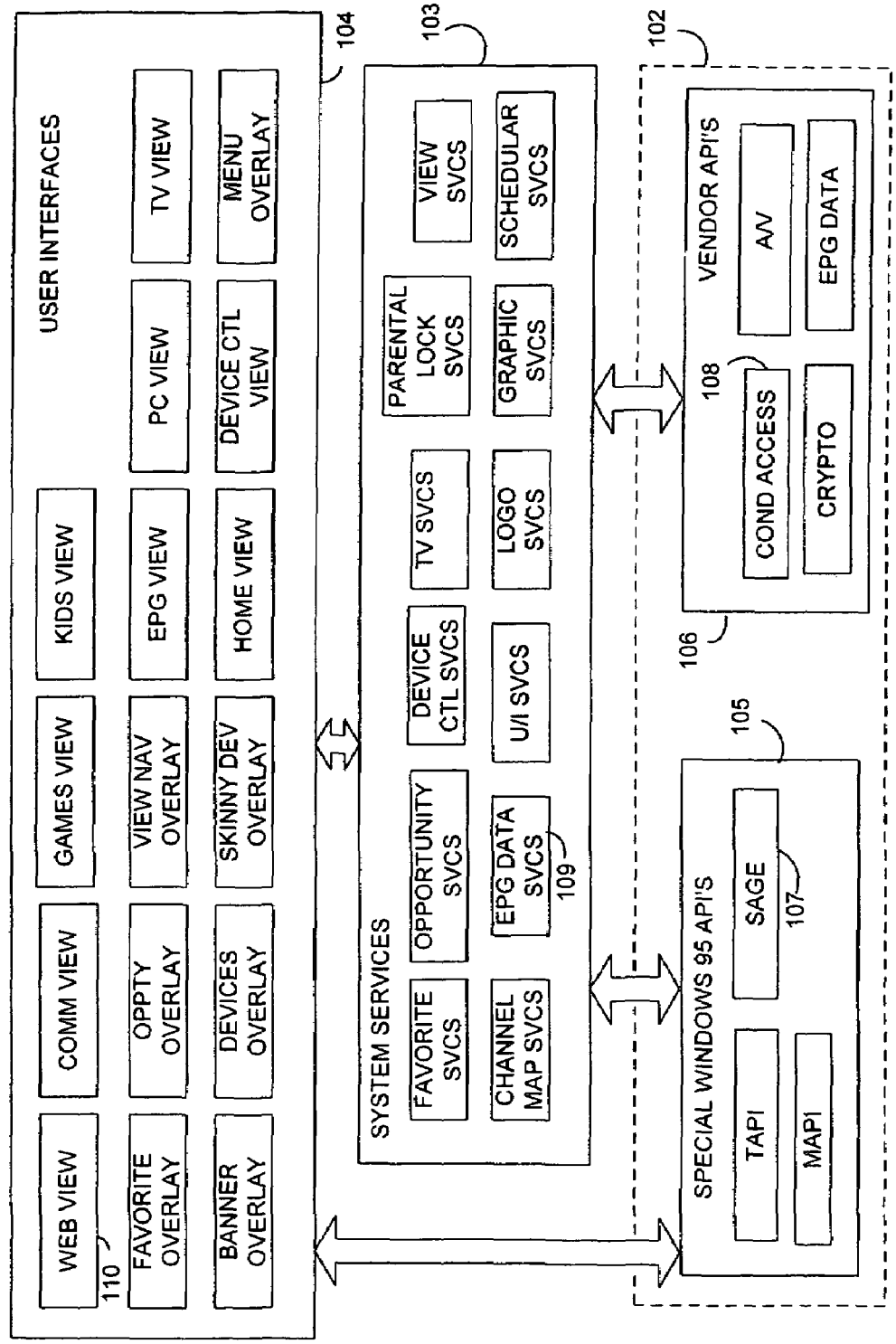
FIG. 1C is a block diagram of a software architecture executing in the digital processing system of FIG. 1B.

One embodiment of a software architecture which provides the underlying infrastructure of processing and file input/output operations necessary for the execution of the scheduled caching system is illustrated in FIG. 1C. The scheduled caching system operates as part of the system services 103 (ex.: EPG data services 109 for an EPG data service). The system services 103 also includes scheduling services 109 which enable the execution of programs at a specified time using a real-time clock in the microprocessor 186. The software architecture illustrated in FIG. 1C is described in detail in co-assigned and co-pending patent application entitled "Architecture for Convergence Systems" filed on the same day as the present application and assigned to the same assignee, which application is hereby incorporated by reference.

Figure 2A:
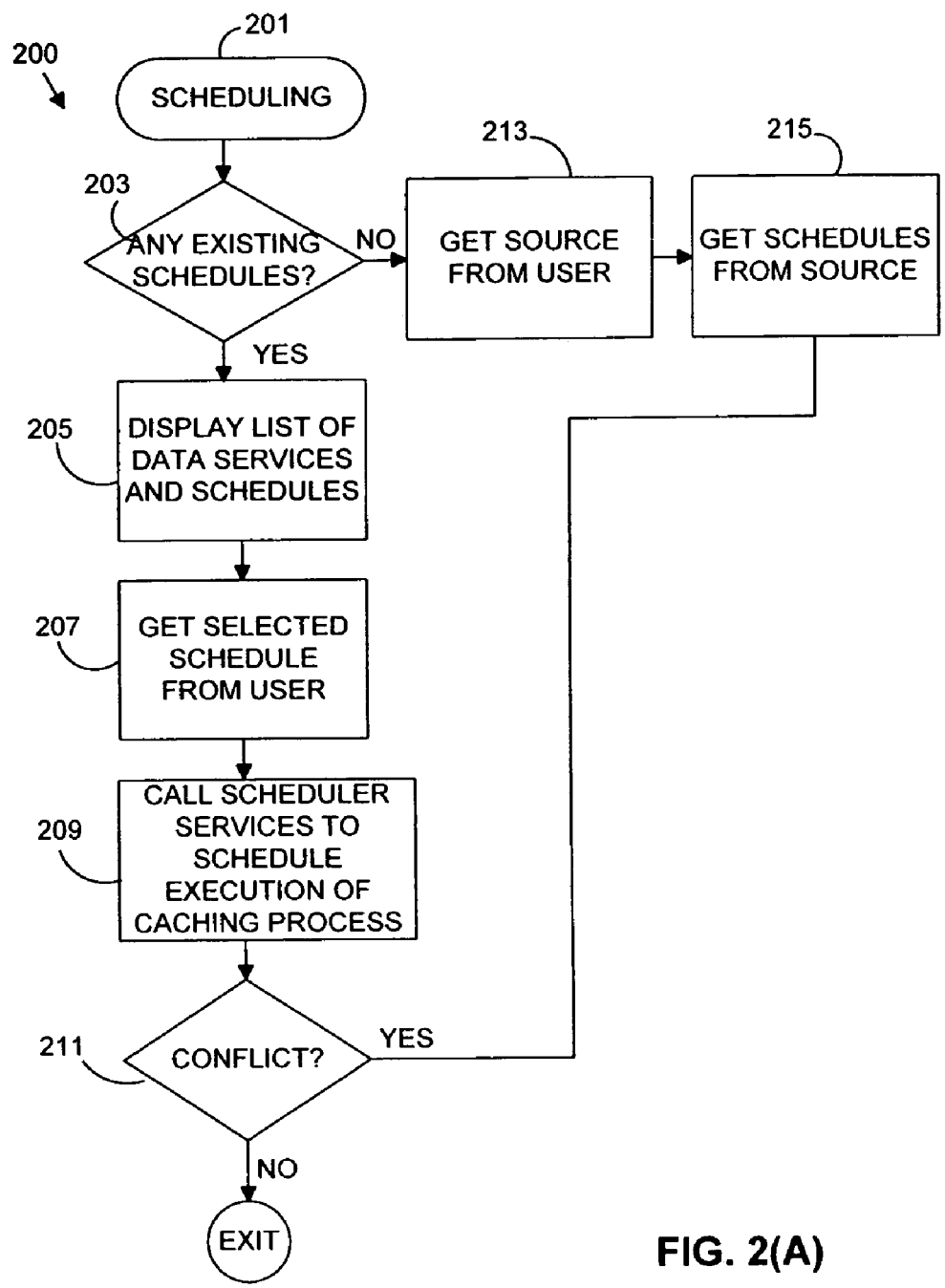
FIGS. 2A–B are operational flow diagrams of two primary processes in one embodiment of a scheduled caching system for in-band data services that operates in the software architecture of FIG. 1C.
Figure 2B:
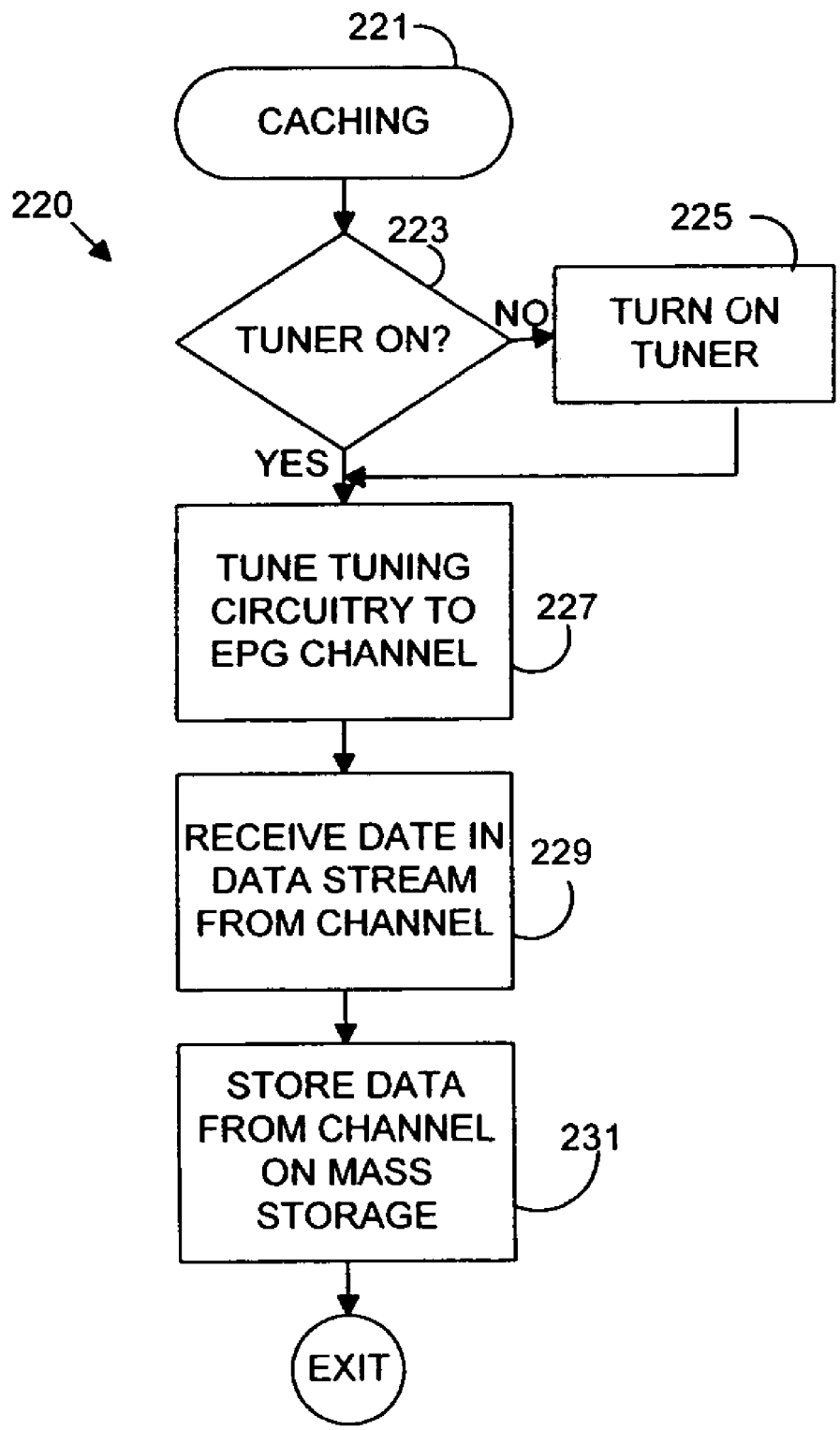

In the embodiment shown in FIGS. 2A and 2B, the scheduled caching system 200 comprises two processes: a scheduling process 201 and a caching process 221. The user of the convergence system 100 begins the execution of the scheduled caching system 200 through any of the well-known methods of software program initiation, such as clicking on an icon or typing in a command. The scheduling process 201 presents the user with a previously-input list of available data services, and their scheduled broadcast times and channels (steps 203 and 205). The user selects a data service broadcast time and channel from the schedules presented. The scheduling process 201 gets the selected schedule time and channel (step 207) and calls scheduler services (scheduler services 109 in FIG. 1C) to schedule execution of the caching process at approximately the selected schedule time (step 209).

Scheduler services determines if there is a conflict with another scheduled event that also requires the tuning circuitry. If not, scheduler services schedules the caching process 221 to execute at a certain time based on the data service broadcast time and notifies the scheduling process 201 (step 211) that the execution of the caching process is successfully scheduled. The scheduling process 201 then exits. If there is a conflict, scheduler services returns an error code to the scheduling process 201 (step 211) and the scheduling process 201 again presents the user with the list of available services (step 205).

If no data services and schedules have been input (step 203), the scheduling process 201 prompts the user to provide a source for the schedules (213). The source of the schedule information can be a portion of the previously downloaded data stream, the Internet, hard media such as a floppy disk or CD-ROM, a dial-up service, or manual input. The scheduling process retrieves the schedules from the designated source (step 215) and presents the list to the user (step 205).

When the execution time for the caching process arrives, scheduler services activates the caching process 221 which then powers on the tuning circuitry (steps 223 and 225) if necessary, and instructs it to tune to the selected schedule channel (step 227). The caching process 221 receives the data stream from the tuning circuitry and parses the in-band data from the remainder of the channel content (step 229). In the current example, the caching process 221 extracts the data from the VBI of the broadcast channel. If the data is delivered in a channel that does not contain other content, the caching process does not need to parse the data as part of step 229. The caching process 221 stores the data on a mass storage device, such as a hard disk, or in memory (step 231) for subsequent processing and exits.

In an alternate embodiment, the user selects multiple data service broadcast times and channels, and the scheduling process 201 calls the scheduler services to schedule multiple executions of the caching process 221.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computerized-system for scheduled caching of in-band data broadcast in a channel comprising:
   a real-time scheduling process; and a user initiated scheduling process operable to provide an interface for a user of a receiver for receiving the in-band data broadcast in the channel to determine a user selection of a scheduled broadcast time in the future and a channel for delivery of an electronic program guide in the in-band data broadcast, and for invoking the real-time scheduling process to schedule execution of a caching process at approximately the scheduled time, wherein the caching process is operable for determining if a scheduling conflict exists, for determining whether tuning circuitry has been powered-on and, if not, powering-on the tuning circuitry if no scheduling conflict exists, for instructing the tuner circuitry to tune to the scheduled channel, for receiving the electronic program guide data from the tuning circuitry regardless of the presence of a user, and for storing the in-band data for subsequent processing, whereby the information may subsequently be retrieved and viewed or used by the user.

2. The computerized-system of claim 1, wherein the scheduling process is further operable for retrieving the scheduled time and channel for electronic program guide programming from a source.

3. The computerized-system of claim 2, wherein the source is an in-band data broadcast.

4. The computerized-system of claim 3, wherein the electronic program guide data is broadcast in a vertical blanking interval of a television channel.

5. The computerized-system of claim 4, wherein the electronic program guide data is broadcast in a portion of a digital satellite transmission channel.

6. The computerized-system of claim 1, wherein the caching process is further operable for parsing the electronic program guide data from other content broadcast in the channel.

7. The computerized system of claim 1 wherein the electronic program guide data originates from multiple sources.

8. The computerized system of claim 1 wherein the user initiated scheduling process is capable of causing the real time scheduling process to schedule multiple executions of the caching process.

9. A method of scheduled caching of in-band data broadcast in a channel comprising:
providing a user interface for enabling a user of a receiver for the in-band data broadcast in the channel to determine a schedule of delivery for an electronic program guide in the in-band data broadcast, wherein the schedule comprises a time and a channel;
receiving from the user a selection of a scheduled broadcast time in the future for the electronic programming guide; and
determining at approximately the scheduled time if a scheduling conflict exists, and if no conflict exists then performing the acts of:
  instructing tuning circuitry to power-on and to tune to the schedule channel at approximately the schedule time;
  receiving the in-band data broadcast in the schedule channel regardless of the presence of a user; and
  storing the in-band data on mass storage for subsequent retrieval and viewing or use by a user.

10. The method of claim 9, wherein determining a time and channel comprises:
displaying a plurality of schedules of different content to a user for selection; and
determining the time and the channel from the schedule selected by the user.

11. The method of claim 10, wherein determining a time and channel comprises:
determining a source for the schedule; and
retrieving the schedule from the source.

12. The method of claim 11, wherein he source for the schedule is in-band broadcast data.

13. The method of claim 9, wherein receiving the in-band data further comprises parsing the electronic program guide from other content broadcast in the channel.

14. A computer-readable medium having computer-executable instructions stored thereon for performing a method comprising:
providing a user interface for enabling a user of a receiver for in-band data broadcast in a channel to determine a schedule of delivery for an electronic program guide in the in-band data broadcast, wherein the schedule comprises a time and a channel;
determining a scheduled broadcast time in the future by a selection of the user the electronic programming guide; and
determining at approximately the scheduled time if a scheduling conflict exists, and if no conflict exists then performing the act of:
  instructing tuning circuitry to power-on and to tune to the schedule channel at approximately the schedule time;
  receiving the in-band data broadcast in the schedule channel regardless of the presence of the user; and
  storing the in-band data on mass storage for subsequent retrieval and viewing or use by the user.

15. A digital processing system comprising:
a processor having real time clock circuitry;
tuning circuitry for powering-on and for tuning and receiving broadcast transmissions, the tuning circuitry communicatively coupled to the processor;
a computer-readable medium communicatively coupled to the central processor; and
a scheduled caching program executed from the computer-readable medium by the processor and providing a user interface for enabling a user of a receiver for in-band data broadcast in a channel to determine a user selection of a scheduled broadcast time in the future and a channel for delivery of an electronic programming guide, wherein the scheduled caching program initiated by a user causes the real-time clock circuitry to schedule a subsequent execution of the scheduled caching program at approximately a scheduled time and the subsequent execution of the scheduled caching program, regardless of the presence of the user, determines at approximately the scheduled time if a scheduling conflict exists, and if no conflict exists then instructs the tuning circuitry to power-on and to tune to a channel, receives in-band data from the tuning circuitry, wherein the in-band data is not audio content and is not video content, and stores the in-band data for subsequent processing for subsequent retrieval and viewing or use by the user.

16. The digital processing system of claim 15, wherein the scheduled caching program parses the in-band data from other content broadcast in the channel.

17. The digital processing system of claim 15, wherein the scheduled time and the channel are selected by a user of the digital processing system from a plurality of data service schedules of different content.

18. The digital processing system of claim 17, wherein the scheduled caching program retrieves one of the data service schedules from an in-band source.

19. A computerized-system for scheduled caching of in-band data broadcast in a channel comprising:
   a real-time scheduling process; and
   a user-initiated scheduling process operable to provide an interface for enabling a user of a receiver for receiving the in-band data broadcast in the channel to determine a user selection of a scheduled broadcast time in the future and a channel for delivery of electronic program guide and having means for determining a scheduled time and channel for an in-band data broadcast, wherein the in-band data broadcast is not audio content and is not video content, and for invoking the real-time schedule process to schedule execution of a caching process at approximately the scheduled time, wherein the caching process determines if a scheduling conflict exists, and if no conflict exists then scheduling provides for instructing tuner circuitry to power-on and to tune to the scheduled channel regardless of the presence of a user, for receiving the in-band data from the tuning circuitry, and for storing the in-band data for subsequent processing.

20. The computerized-system of claim 19, wherein the scheduling process further has means for retrieving the scheduled time and channel from a source.

21. The computerized-system of claim 19, wherein the caching process further has means for parsing the in-band data from other content broadcast in the channel.

22. The system of claim 19, wherein the in-band data broadcast includes stock quotes.

23. The system of claim 19, wherein the in-band data broadcast includes sports scores.

24. An information handling system comprising:
   a tuner capable of powering-on, the tuner further being tunable to a plurality of channels; and
   a scheduler operable to provide an interface for enabling a user of a receiver for receiving in-band broadcast data broadcast in a channel to determine a user selection of a scheduled broadcast time in the future and a channel for delivery of an electronic program guide and configured to determine a scheduled time and a scheduled channel from the plurality of channels, for receiving information associated with the scheduled channel, the information being non-audio and non-video in-band information, the operation of said scheduler being initiated by a user, wherein the scheduler at approximately the scheduled time determines if a scheduling conflict exists, and if no conflict exists then causes the tuner to power-on and tune to the scheduled channel at approximately the scheduled time, regardless of the presence of the user, to receive the information associated with the channel.

25. The information handling system of claim 24, wherein the information further comprises Internet-related information.

26. The information handling system of claim 24, wherein the scheduler comprises:
   a real-time scheduling process; and
   a scheduling process which determines the scheduled time and the scheduled channel, and invokes the real-time scheduling process to schedule execution of a caching process at approximately the scheduled time, wherein the caching process instructs the tuner to tune to the scheduled channel, receives the information associated with the scheduled channel from the tuner, and stores the information for subsequent processing.

27. The information handling system of claim 26, wherein the scheduling process retrieves the scheduled time and the scheduled channel from information received from one of the plurality of channels.

28. The information handling system of claim 26, wherein the caching process powers-on the tuner.

29. A computer-readable medium having computer-executable instructions stored thereon for performing a method comprising:
   providing an interface for use by a user of a receiver of in-band data broadcast in the future in determining a scheduled broadcast time in the future and a scheduled channel for an electronic program guide, the guide comprising non-audio and non-video in-band information, said determining being initiated by a user; and
   determining at approximately the scheduled time if a scheduling conflict exists, and if no conflict exists then instructing a tuner to power-on and to tune to the scheduled channel at approximately the scheduled time to receive the information associated with the scheduled channel, regardless of the presence of the user, and store the information associated with the channel for subsequent processing, whereby the information may subsequently be retrieved and viewed or used by the user.

30. The information handling system of claim 29, wherein the information further comprises internet-related information.

31. The computer-readable medium of claim 29 wherein the information comprises stock quotes.

32. The computer-readable medium of claim 29, wherein the information comprises sports scores.

33. A method for handling information comprising the steps of:
   providing a user interface for use by a user of a receiver for receiving in-band broadcast data broadcast in a channel in determining a user selection of a scheduled broadcast time in the future and a scheduled a channel for delivery of an electronic program guide, the guide comprising non-audio and non-video in-band information including electronic program guide information, said determining being initiated by a user; and
   determining if at approximately the scheduled time a scheduling conflict exists, and if no conflict exists then instructing a tuner to power-on and to tune to the scheduled channel at approximately the scheduled time to receive the information associated with the scheduled channel, regardless of the presence of the user, and store the information associated with the channel for subsequent processing.

34. The information handling system of claim 33, wherein the information further comprises internet-related information.

35. The method of claim 33, wherein the information comprises stock quotes.

36. The method of claim 33, wherein the information comprises sports scores.

* * * * *